United States Patent
Safarzdeh-Amiri

(10) Patent No.: US 10,118,061 B2
(45) Date of Patent: Nov. 6, 2018

(54) CATALYST AND PROCESS FOR TREATMENT OF FLUID COMPRISING AN OXIDIZABLE CONTAMINANT

(71) Applicant: Trojan Technologies, London (CA)

(72) Inventor: Ali Safarzdeh-Amiri, Oakville (CA)

(73) Assignee: TROJAN TECHNOLOGIES, London, ON (CA)

( * ) Notice: Subject to any disclaimer, the term of this patent is extended or adjusted under 35 U.S.C. 154(b) by 0 days.

(21) Appl. No.: 15/519,164

(22) PCT Filed: Oct. 16, 2015

(86) PCT No.: PCT/CA2015/051042
§ 371 (c)(1),
(2) Date: Apr. 14, 2017

(87) PCT Pub. No.: WO2016/058103
PCT Pub. Date: Apr. 21, 2016

(65) Prior Publication Data
US 2017/0232287 A1  Aug. 17, 2017

Related U.S. Application Data

(60) Provisional application No. 62/122,324, filed on Oct. 17, 2014.

(51) Int. Cl.
*A62D 3/38* (2007.01)
*B01J 27/185* (2006.01)
(Continued)

(52) U.S. Cl.
CPC ............ *A62D 3/38* (2013.01); *B01J 27/1853* (2013.01); *C01B 17/0434* (2013.01); *C02F 1/725* (2013.01); *C10L 3/101* (2013.01); *A62D 2101/28* (2013.01); *A62D 2101/47* (2013.01); *C02F 2101/322* (2013.01); *C02F 2303/02* (2013.01)

(58) Field of Classification Search
CPC .. A62D 3/38; A62D 2101/28; A62D 2101/47; C02F 1/725; C02F 2101/101; C10L 3/103; C01B 17/05; B01D 2251/10; B01D 2251/61; B01D 2251/90; B01D 2257/304

See application file for complete search history.

(56) References Cited

U.S. PATENT DOCUMENTS 4,515,764 A    5/1985 Diaz
4,518,576 A *  5/1985 Diaz .................. B01D 53/1418
                                             23/293 S (Continued)

OTHER PUBLICATIONS

International Search Report and Written Opinion corresponding to International Patent Application No. PCT/CA2015/051042, dated Feb. 6, 2016.

*Primary Examiner* — Timothy C Vanoy
(74) *Attorney, Agent, or Firm* — McAndrews Held & Malloy, Ltd

(57) ABSTRACT

Described is a process for treatment of a fluid comprising an oxidizable contaminant selected from one or both of a sulfide and a thiol, the process comprising the step of contacting the fluid with a first complex of ferric iron and a polyphosphate to oxidize the oxidizable contaminant and generate a second complex of ferrous ion and the polyphosphate.

20 Claims, 2 Drawing Sheets

(51) Int. Cl.
    *C10L 3/10*        (2006.01)
    *C02F 1/72*        (2006.01)
    *C01B 17/04*      (2006.01)
    *A62D 101/28*     (2007.01)
    *A62D 101/47*     (2007.01)
    *C02F 101/32*     (2006.01)

(56) References Cited

U.S. PATENT DOCUMENTS

| | | |
|---|---|---|
| 4,784,775 A | 11/1988 | Hardison |
| 5,616,306 A * | 4/1997 | Mazgarov .............. B01D 53/52 423/228 |
| 6,160,194 A | 12/2000 | Pignatello |
| 6,960,330 B1 | 11/2005 | Cox, Jr. |
| 2003/0194366 A1 | 10/2003 | Srinivas et al. |
| 2014/0014586 A1 | 1/2014 | Soane et al. |

* cited by examiner

CATALYST AND PROCESS FOR TREATMENT OF FLUID COMPRISING AN OXIDIZABLE CONTAMINANT

CROSS-REFERENCE TO RELATED APPLICATION

The present application is a National Phase Entry of PCT International Application No. PCT/CA2015/051042, which was filed on Oct. 16, 2015, and claims the benefit under 35 U.S.C. § 119(e) of U.S. provisional patent application Ser. No. 62/122,324, filed Oct. 17, 2014, the contents of which are hereby incorporated by reference.

BACKGROUND OF THE INVENTION

Field of the Invention

Aspects of the present invention relate to a stable catalyst for liquid redox sulfur recovery processes and circumneutral Fenton-like oxidation processes.

Description of the Prior Art

Complexes comprising ferric ion—Fe(III)—sequestered with suitable chelating reagents have been used as catalysts in liquid redox sulfur recovery (LRSR) processes to control hydrogen sulfide ($H_2S$) emissions and to recover elemental sulfur. These catalysts are also used in Fenton-like oxidation processes carried out in solutions with pH ranging from neutral to alkaline. The chelated iron most often employed in LRSR processes are Fe(III)-Nitrilotriacetate (NTA) and Fe(III)-Ethylenediaminetetraacetic acid (EDTA). A major disadvantage with conventional chelated iron employed in these processes is oxidation of the ligands over time and the consequent eventual loss of catalyst. Although the use of free radical scavengers can prolong the useful life of these catalysts, there is still appreciable catalyst loss over time. A further disadvantage with conventional chelated iron employed in a LRSR process is the relatively high cost of the chelating agents as well as their residual environmental impact.

LRSR processes employing chelated iron can be used to remove $H_2S$ from for example natural gas and refinery flue gas (Hua et al., 2002; DeBerry, 1997). In this process, a solution comprising Fe(III)-L (where "L" denotes a conventional ligand such as NTA, EDTA, or similar chelating reagents) at ambient temperature (20-25° C.) absorbs $H_2S$ from the gas phase in an absorbing vessel and oxidizes sulfide to elemental sulfur according to the following reactions:

$$H_2S(Gas) \leftrightarrow H_2S(Aq) \leftrightarrow H^+ + HS^- \qquad (1)$$

$$HS^- + 2Fe(III)\text{-}L \rightarrow 2Fe(II)\text{-}L + 2H^+ + 1/8S_8 \qquad (2)$$

The Fe(II)-L formed in the absorber vessel is oxidized by air to Fe(III)-L in another vessel according to the following reaction:

$$Fe(II)\text{-}L + 1/2O_2 + H_2O \rightarrow Fe(III) + 2OH^- \qquad (3)$$

Therefore, the overall reaction for the oxidation of $H_2S$ in these processes is as follows:

$$1/2O_2 + H_2S \rightarrow H_2O + 1/8S_8 \qquad (4)$$

Equation (4) shows that under ideal conditions Fe(III)-L acts as a catalyst for the oxidation of $H_2S$ by oxygen. However, the actual conditions are less than ideal, and although applied widely, a major disadvantage of the LRSR process is ligand oxidation and eventual loss of iron catalyst. This is because oxidation of Fe(II)-L to Fe(III)-L by air is believed to generate hydroxyl radical (●OH), a powerful oxidizing agent, according to the following reactions:

$$Fe(II)\text{-}NTA + O_2 + H_2O \rightarrow Fe(III)\text{-}NTA + H_2O_2 + OH^- \qquad (5)$$

$$Fe(II)\text{-}NTA + H_2O_2 \rightarrow Fe(III)\text{-}NTA + OH^- + \bullet OH \qquad (6)$$

The OH-radical generated in the above process reacts with, and degrades, the ligand (e.g., EDTA, NTA) causing iron to hydrolyze and precipitate out as ferric hydroxide (Neumann and Lynn, 1984; Chen et al., 1993).

The oxidation and eventual loss of ligands, and by extension iron-chelate, considerably increases operating costs for the LRSR process and limits its use. Attempts have been made to increase the useful life of Fe(III)-L by: a) synthesis of chelates more resistant to OH-radical attack (Hua et al., 2005); and b) using OH-radical scavengers (Diaz, 1983). Although these strategies were able to reduce the rate of oxidation of ligand and hence its loss, appreciable catalyst loss is still evident over time. Further, the strategies preclude the use of $H_2O_2$ to enhance these LRSR processes, which further increases the rate of OH-radical production and hence oxidation of the ligand.

A further disadvantage of employing conventional chelated iron in an LRSR process is that the recovered sulfur is impure and of lesser value than pure sulfur.

Oxidation of sulfide by Fe(III)-L is also a convenient method for generation of Fe(II)-L, which can react with $H_2O_2$ (see Equation (6)) in a Fenton-like oxidation process to generate hydroxyl radical; the latter can be used to oxidize organic pollutants in water and soil (Dao and De Laat, 2011 and Cox, U.S. Pat. No. 6,960,330, 2005, Pignatello, U.S. Pat. No. 6,160,194, 2000). Since the iron(III)-L employed in these processes undergoes redox recycling, the oxidation of sulfide to elemental sulfur by iron(III)-L under circumneutral pH provides a potentially fast, convenient, and economical method of generating iron(II) to drive Fenton reactions. However, such use has been limited given the instability of conventional ligands in the presence of hydroxyl radical and the fact that there is presently no economically viable means to employ the Fenton reaction at a pH in the range of about 6-9.

SUMMARY OF THE INVENTION

It is an object of the present invention to obviate or mitigate at least one of the above-mentioned disadvantages of the prior art.

It is another object of the present invention to provide a novel process for treatment of a fluid comprising an oxidizable contaminant selected from one or both of a sulfide and a thiol.

It is another object of the present invention to provide a novel use of an aqueous solution comprising a ferric ion complexed to a polyphosphate.

It is another object of the present invention to provide a novel method for reducing the toxicity of a fluid.

It is another object of the present invention to provide a novel process for oxidizing a reduced organic sulfur compound.

Accordingly, in one of its aspects, the present invention provides a process for treatment of a fluid comprising an oxidizable contaminant selected from one or both of a sulfide and a thiol, the process comprising the step of contacting the fluid with a first complex of ferric iron and a polyphosphate to oxidize the oxidizable contaminant and generate a second complex of ferrous ion and the polyphosphate.

In another of its aspects, the present invention provides a use of an aqueous solution comprising a first complex of ferric ion complexed to a polyphosphate to treat a fluid comprising an oxidizable contaminant selected from one or both of a sulfide and a thiol.

In yet another of its aspects, the present invention provides a method for reducing the toxicity of a fluid, the method comprising: adding to a reactor a fluid comprising one or more organic compounds and at least one of hydrogen sulfide or a thiol; contacting the fluid with a first complex of ferric ion and a polyphosphate to form a first mixture; and adding hydrogen peroxide to the first mixture to form a second mixture.

In another of its aspects, the present invention provides a method for reducing the toxicity of a fluid, the method comprising: adding to a reactor a fluid comprising one or more organic compounds; mixing at least one of hydrogen sulfide or a thiol with the fluid to form a first mixture; mixing the first mixture with an aqueous solution comprising a ferric ion complexed with a polyphosphate to form a second mixture; and adding hydrogen peroxide to the second mixture to form a third mixture.

In one of its aspects, the present invention provides a method to improve the economy and/or performance of LRSR processes by utilizing a polyphosphate chelate of Fe, optionally with the addition of $H_2O_2$ to enhance the removal of $H_2S$.

In another of its aspects, the present invention provides a method to improve the economy and/or performance of circumneutral pH Fenton-like applications for the destruction of toxic and/or recalcitrant organic contaminants present in water or wastewater.

In another of its aspects, the present invention provides methods and know-how to oxidize and remove $H_2S$ and odours from natural and refinery vapor streams, sour water, spent caustic, etc.

In yet another of its aspects, the present invention provides a method of removing volatile organic compounds from vapor streams, the method comprising adding $H_2O_2$ into vapor scrubbing systems (e.g., LRSR processes) that incorporate a polyphosphate chelate of Fe to effect the application of circumneutral pH Fenton-like chemistry.

In another of its aspects, the present invention provides methods and know-how to recover sulfur from natural and refinery vapor streams.

Thus, the present inventor has recognized that a polyphosphate (e.g., sodium tetrapolyphosphate, $Na_6$-TPP) cannot be readily oxidized by OH-radical and when complexed with Fe(III) and used as a catalyst in for example an LRSR process, its rate of loss will be negligible. It is believed that the primary mechanism for the loss (if there is any) of Fe(III)-tetrapolyphosphate (Fe(III)-TPP) is its carry-out by sulfur products which can be eliminated or minimized when operated under appropriate pH (e.g., 3-11). As used throughout this specification, the terms iron(III)-polyphosphate (iron(III)-PP) or iron(III) complex preferably include any Fe(III)-polyphosphate that is soluble in water and that can react with, and oxidize, sulfide ion to elemental sulfur in the presence of air and/or hydrogen peroxide.

One preferred embodiment of the present invention is a method for oxidizing $H_2S$ from natural gas, refinery vapor streams, sour water, spent caustic, etc. without the loss of catalyst. Another embodiment of the present invention is oxidation of organic contaminants in industrial effluents employing sulfide ion, Fe(III)-PP and hydrogen peroxide and/or air/oxygen. Yet another embodiment of the present invention is recovery of sulfur from natural and refinery vapor streams.

An advantage of the present process is that it is very fast with a short hydraulic residence time and can be implemented in a continuous flow through process without the need for a large reaction tank or tanks. Other advantages of the invention will become apparent to those of skill in the art upon reviewing the present specification.

BRIEF DESCRIPTION OF THE DRAWINGS

Embodiments of the present invention will be described with reference to the accompanying drawings, wherein like reference numerals denote like parts, and in which.

DETAILED DESCRIPTION OF THE PREFERRED EMBODIMENTS

Figure 1:
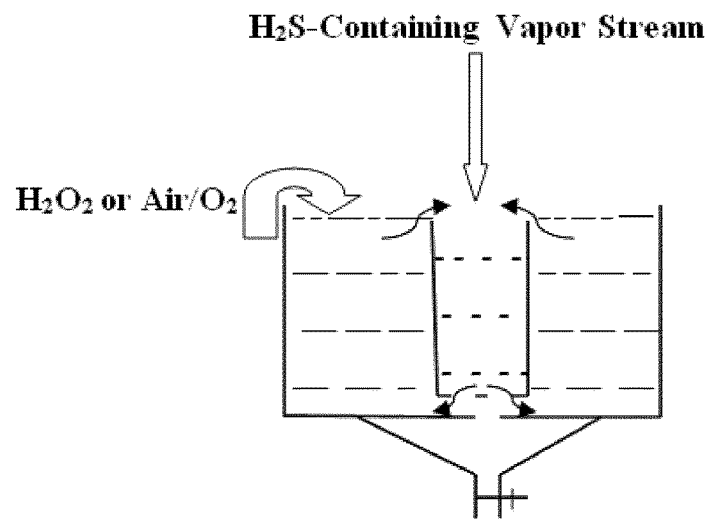
FIG. 1 is a schematic illustration of a reactor for treating an $H_2S$-containing vapor stream and organics with Fe(III)-TPP. According to an embodiment of the invention, the vessel is filled with Fe(III)-TPP solution, the gas is contacted with the solution containing Fe(III)-TPP solution, hydrogen sulfide is converted to elemental sulfur and water, and Fe(II)-TPP generated is oxidized back to Fe(III)-TPP employing $H_2O_2$, $O_2$ and/or air. The latter step generates OH-radicals, which can react with, and oxidize, organics present in the $H_2S$-containing vapor stream and absorbed by the solution.

In one of its aspects, the present invention provides a process for treatment of a fluid comprising an oxidizable contaminant selected from one or both of a sulfide and a thiol, the process comprising the step of contacting the fluid with a first complex of ferric iron and a polyphosphate to oxidize the oxidizable contaminant and generate a second complex of ferrous ion and the polyphosphate. Preferred embodiments of this process may include any one or a combination of any two or more of any of the following features:

the further step of contacting the second complex with an oxidizing agent to regenerate the first complex;
the oxidizing agent comprises oxygen;
the further step of producing hydrogen peroxide;
the oxidizing agent comprises hydrogen peroxide and a hydroxyl radical is produced;
contacting the hydroxyl radical with one or more oxidizable organic compounds;
the one or more organic compounds are contaminants in wastewater;
the one or more organic compounds are selected from the group consisting of: phenol, benzene, toluene, ethylbenzene, a xylene and any mixture of two or more of these;
the fluid is selected from the group consisting of natural gas, a refinery vapor stream, a refinery sour gas stream, wastewater and sludge;

the process is employed to remove one or more odourous compounds;

the polyphosphate is selected from the group consisting of: tripolyphosphate, tetrapolyphosphate, pentapolyphosphate and hexapolyphosphate;

the polyphosphate is tetrapolyphosphate;

the process is used for liquid redox sulfur recovery;

the ferric ion complexed to the polyphosphate is a catalyst for the oxidation reaction;

the step of contacting the fluid with a first complex of ferric iron and a polyphosphate is conducted at a pH of between 3 and 10; and/or the step of contacting the fluid with a first complex of ferric iron and a polyphosphate is conducted at a pH of between 5 and 9.

In another of its aspects, the present invention relates to use of an aqueous solution comprising a first complex of ferric ion complexed to a polyphosphate to treat a fluid comprising an oxidizable contaminant selected from one or both of a sulfide and a thiol. Preferred embodiments of this use may include any one or a combination of any two or more of any of the following features:

the treatment includes generating a second complex of ferrous ion and the polyphosphate;

the ferrous ion is contacted with an oxidizing agent to regenerate the first complex;

the oxidizing agent comprises oxygen;

the use further produces hydrogen peroxide;

the oxidizing agent comprises hydrogen peroxide and a hydroxyl radical is produced;

the hydroxyl radical is contacted with one or more oxidizable organic compounds;

the one or more organic compounds are contaminants in wastewater;

the one or more organic compounds are selected from the group consisting of: phenol, benzene, toluene, ethylbenzene, a xylene, and any mixture of two or more of these;

the fluid is selected from the group consisting of: natural gas, a refinery vapor stream, a refinery sour gas stream, wastewater, and sludge;

the use removes one or more odourous compounds;

the polyphosphate is selected from the group consisting of: tripolyphosphate, tetrapolyphosphate, pentapolyphosphate and hexapolyphosphate;

the polyphosphate is tetrapolyphosphate;

the use is for liquid redox sulfur recovery;

the ferric ion complexed to the polyphosphate is a catalyst for the oxidation reaction;

the aqueous solution is maintained at a pH of between 3 and 10; and/or the aqueous solution is maintained at a pH of between 5 and 9.

In another of its aspects, the present invention relates to a method for reducing the toxicity of a fluid, the method comprising: adding to a reactor a fluid comprising one or more organic compounds and at least one of hydrogen sulfide or a thiol; contacting the fluid with a first complex of ferric ion and a polyphosphate to form a first mixture; and adding hydrogen peroxide to the first mixture to form a second mixture. Preferred embodiments of this method may include any one or a combination of any two or more of any of the following features:

the at least one of hydrogen sulfide or thiol is oxidized by the ferric ion to generate a second complex of ferrous ion and the polyphosphate;

the second complex is contacted with an oxidizing agent to regenerate the first complex;

the oxidizing agent comprises oxygen;

the further step of producing hydrogen peroxide;

the oxidizing agent comprises hydrogen peroxide and a hydroxyl radical is produced;

the hydroxyl radical oxidizes at least one of the one or more organic compounds;

the one or more organic compounds are selected from the group consisting of: phenol, benzene, toluene, ethylbenzene a xylene, and a mixture of two or more of these;

the fluid is selected from the group consisting of: natural gas, a refinery vapor stream, a refinery sour gas stream, wastewater and sludge;

the method is performed to remove one or more odourous compounds;

the polyphosphate is selected from the group consisting of: tripolyphosphate, tetrapolyphosphate, pentapolyphosphate and hexapolyphosphate;

the polyphosphate is tetrapolyphosphate;

the method is used for liquid redox sulfur recovery;

the ferric ion complexed to the polyphosphate is a catalyst for the oxidation reaction;

the second mixture is maintained at a pH of between 3 and 10;

the second mixture is maintained at a pH of between 5 and 9; and/or the reactor is selected from the group consisting of: a pipe reactor, a continuously stirred tan reactor, a baffled tank or vessel, a basin, a lagoon, a recirculating vapor scrubber, and a pressurized plug-flow reactor.

In another of its aspects, the present invention relates to a method for reducing the toxicity of a fluid, the method comprising: adding to a reactor a fluid comprising one or more organic compounds; mixing at least one of hydrogen sulfide or a thiol with the fluid to form a first mixture; mixing the first mixture with an aqueous solution comprising a ferric ion complexed with a polyphosphate to form a second mixture; and adding hydrogen peroxide to the second mixture to form a third mixture. Preferred embodiments of this method may include any one or a combination of any two or more of any of the following features:

the at least one of hydrogen sulfide or thiol is oxidized by the ferric ion to generate a second complex of ferrous ion and the polyphosphate;

the second complex is contacted with an oxidizing agent to regenerate the first complex;

the oxidizing agent comprises oxygen;

the further step of producing hydrogen peroxide;

the oxidizing agent comprises hydrogen peroxide and a hydroxyl radical is produced;

the hydroxyl radical oxidizes at least one of the one or more organic compounds;

the one or more organic compounds is selected from the group consisting of: phenol, benzene, toluene, ethylbenzene, a xylene, and a mixture of two or more of these;

the fluid is selected from the group consisting of: natural gas, a refinery vapor stream, a refinery sour gas stream, wastewater and sludge;

the method is performed to remove one or more odourous compounds;

the polyphosphate is selected from the group consisting of: tripolyphosphate, tetrapolyphosphate, pentapolyphosphate and hexapolyphosphate;

the polyphosphate is tetrapolyphosphate;

the method is used for liquid redox sulfur recovery;
the ferric ion complexed to the polyphosphate is a catalyst for the oxidation reaction;
the third mixture is maintained at a pH of between 3 and 10;
the third mixture is maintained at a pH of between 5 and 9; and/or
the reactor is selected from the group consisting of: a pipe reactor, a continuously stirred tan reactor, a baffled tank or vessel, a basin, a lagoon, a recirculating vapor scrubber, and a pressurized plug-flow reactor.

In one of its aspects, the present invention provides a process for oxidizing hydrogen sulfide and/or organic sulfur contaminants (i.e., thiols e.g., methyl thiol, disulfides e.g., dimethyl disulfide, thioethers e.g., dimethyl sulfide, sulfoxides e.g., dimethyl sulfoxide, or thiophenes e.g., tetrahydrothiophene and thiourea) in an oxidation reaction process comprising reacting the organic sulfur contaminant with a ferric ion in an aqueous solution, wherein the ferric ion is complexed with a polyphosphate forming an Fe-polyphosphate catalyst complex.

In another of its aspects, the present invention relates to a use of an aqueous solution comprising a ferric ion complexed to a polyphosphate to oxidize hydrogen sulfide and/or an organic sulfur contaminant (i.e., thiols e.g., methyl thiol, disulfides e.g., dimethyl disulfide, thioethers e.g., dimethyl sulfide, sulfoxides e.g., dimethyl sulfoxide, thiophenes e.g., tetrahydrothiophene and thiourea) in an oxidation reaction.

In another of its aspects, the present invention relates to a method for reducing the toxicity of a fluid, the method comprising: adding to a reactor a fluid comprising one or more organic contaminants (e.g., Naphthenic acids, aromatics (e.g., benzene-toluene-xylene, polycyclic aromatic hydrocarbons—PAH), phenols and quinones (e.g., phenol, cresol, hydroquinone), amines (e.g., alkanolamines, triazines), aldehydes (e.g., formaldehyde, acetaldehyde), pesticides (e.g., organophosphates, sulfonamides, halogenated organics), pharmaceuticals and personal care products, alcohols and glycols (e.g., methanol, ethylene glycol), metal chelants (e.g., EDTA, DPDA, etc.), azo dyes, surfactants, organic deposits (e.g., biofilms, gums, detritus) on for example piping systems and filter or adsorption media) and a reduced organic sulfur compound (e.g., sulfides, sulfites from sodium salts or sulfur dioxide, thiosulfate, hydroxylamine, thiocyanate); mixing the fluid with an aqueous solution comprising a ferric ion complexed with a polyphosphate to form a first mixture; and adding hydrogen peroxide to the mixture to form a second mixture.

In another of its aspects, the present invention relates to a method for reducing the toxicity of a fluid, the method comprising: adding to a reactor a fluid comprising organic contaminants (e.g., Naphthenic acids, aromatics (e.g., benzene-toluene-xylene, polycyclic aromatic hydrocarbons—PAH), phenols and quinones (e.g., phenol, cresol, hydroquinone), amines (e.g., alkanolamines, triazines), aldehydes (e.g., formaldehyde, acetaldehyde), pesticides (e.g., organophosphates, sulfonamides, halogenated organics), pharmaceuticals and personal care products, alcohols and glycols (e.g., methanol, ethylene glycol), metal chelants (e.g., EDTA, DPDA, etc), azo dyes, surfactants, organic deposits (biofilms, gums, detritus) on for example piping systems and filter or adsorption media); mixing a reduced organic sulfur compound (e.g., sulfides, sulfites from sodium salts or sulfur dioxide, thiosulfate, hydroxylamine, thiocyanate) with the fluid to form a first mixture; mixing the first mixture with an aqueous solution comprising a ferric ion complexed with a polyphosphate to form a second mixture; and adding hydrogen peroxide to the second mixture to form a third mixture.

In any of the aforementioned aspects of the invention the Fe-polyphosphate catalyst complex can be added to the solution as a pre-formed complex (dry or in solution), produced onsite (ex-situ), or formed in-situ within the reactor system. Ferric ion can be made present by the addition of ferrous or ferric salts of chloride or sulfate, nano particles of iron (zero-valence iron, or magnetite), formed in-situ (e.g., electrolysis from iron electrodes), endogenous within the water being treated, or by the addition of an Fe-polyphosphate complex; polyphosphate can be made present by the addition of polyphosphate or polyphosphoric acid or Fe-polyphosphate catalyst complex.

Many polyphosphate salts dissolve in aqueous solution to yield a polyphosphate solution which forms soluble complexes with both ferric and ferrous ions. For example, hexasodium tetrapolyphosphate ($Na_6$-TPP) gives rise in solution to TPP which complexes with ferric ion to form an Fe(III)-TPP complex soluble in aqueous solutions under neutral and basic pH. The Fe(III):TPP stoichiometry ratio may vary from 1:1 to 1:2, etc. In the present specification, the term "Fe(III)-polyphosphate" includes any Fe(III)-polyphosphate that is soluble in an aqueous solution and is capable of oxidizing e.g., $H_2S$, to elemental sulfur, or other reducing reagents. Examples of preferred polyphosphates include tripolyphosphate, TPP, pentapolyphosphate, and hexapolyphosphate. Herein the terms "hydrogen sulfide" and "$H_2S$" encompass both gaseous hydrogen sulfide and hydrogen sulfide in solution ($H_2S_{(Aq.)}$, $HS^-$), referred to as sulfide herein.

The rates of reaction of OH-radical with phosphate ($k<1.0\times10^7$ $mole^{-1}$ $s^{-1}$) and diphosphate ($k=9.0\times10^5$ $mole^{-1}$ $s^{-1}$) are relatively slow. In one aspect, the present invention exploits the finding that the rate of oxidation of certain polyphosphate salts (e.g., $Na_6$-TPP) by OH-radical is also slow (and in preferred embodiments can be negligible) compared to ligands conventionally employed in LRSR. Further, when the polyphosphate is complexed in aqueous solution with Fe(III) and used as a catalyst (e.g., in an LRSR process), the rate of loss of the Fe(III)-PP complex (e.g., Fe(III)-TPP) is very low, if any (and in preferred embodiments can be negligible) compared to conventional ligands. Although Fe(III)-PP can be lost in the carry-out sulfur product, this effect can be regulated by monitoring the pH of the reaction environment and is not appreciable when the reaction is operated under the appropriate pH range of 3-11.

The process described herein can be used to remove $H_2S$ from any fluid including a liquid or a gas. Herein the meaning of the term "fluid" encompasses a liquid substance (including sludge, such as wastewater sludge), a gaseous substance, or a substance that is a combination of liquid and gas. An example of a liquid fluid is liquid effluent. An example of a gaseous fluid is a vapor stream.

In one embodiment, Fe(III)-PP can be used as a catalyst in an aqueous solution for the air oxidation of $H_2S$ under circumneutral pH according to the following reaction:

(7)

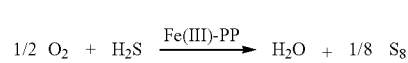

$$1/2\ O_2 + H_2S \xrightarrow{Fe(III)-PP} H_2O + 1/8\ S_8$$

As would be evident to a person skilled in the art, Fe(III) (and by extension Fe(III)-PP) functions as a catalyst in the above reaction. The chelated ferric ion of the Fe(III)-PP complex is initially reduced by the dissolved $H_2S$ (i.e., $H_2S$ and/or $HS^-$) to a ferrous ion, which can then be oxidized back to a ferric ion in the presence of a suitable oxidizing agent (e.g., oxygen or hydrogen peroxide). The ferric/ferrous ion typically remains complexed with the PP throughout the redox reactions. In embodiments where OH-radical is generated in the reaction mixture (e.g., when the catalytic oxidation of $H_2S$ is carried out in the presence of hydrogen peroxide or air), the rate of reaction of polyphosphate with the OH-radical is expected to be very slow and accordingly the rate of attrition of chelated Fe(III)-PP catalyst is expected to be very low and negligible, if any.

The invention can be implemented under standard LRSR conditions as are known in the art. Polyphosphates, including TPP, are readily commercially available (for example in the form of $Na_6$-TPP). $Na_6$-TPP represents a preferred compound since it is relatively inexpensive and environmentally non-toxic. The preferred pH range of the reaction is pH 3-11; more preferred is a pH range of pH 3-10; and highly preferred is a pH range of pH 3-9. The Fe(III)-TPP catalyst is preferably prepared using the following steps: 1) dissolve the desired amount of $Na_6$-TPP in water; and 2) add Fe(III) (a suitable Fe(III)/TPP ratio is 1:2 but it could be lower or higher). Fe(III) may be added as salt (e.g., ferric sulfate) or a salt solution (e.g., ferric sulfate dissolved in water). In this case, the solution comprises water, Fe(III)-TPP and the counter ions that come from polyphosphate and iron salt (e.g., sodium ion, sulfate ion).

In some embodiments, the reagent used to oxidize the ferrous ion to the ferric ion may be oxygen, which may be present in air in the reaction environment or either injected into the solution from an oxygen source/tank or generated in-situ or ex-situ as a supersaturated solution or by the decomposition of a peroxide (e.g., $H_2O_2$). In other embodiments the oxidizing reagent may be hydrogen peroxide, which can be manually added as a component of the reaction mixture, or may be produced as a by-product of previous oxidation of a ferrous ion by oxygen, or may be generated in situ or ex-situ by electrolysis, enzymolysis, oxidation of Fe(II)-PP by oxygen or chemical synthesis.

The processes described herein can be used to oxidize $H_2S$ present in a variety of liquids and gases, including natural gas, refinery vapor streams, sour water, spent caustic, crude oil, sludge, wastewater at the headworks stage of wastewater treatment, etc. Typically the rate of loss of iron catalyst (when used for the oxidation of $H_2S$ in gas phase) during operation of the process is negligible as compared to conventional chelators (e.g., NTA, EDTA) that are employed presently. The process can be useful in multiple industrial settings including oil refineries (e.g., in stripped sour waters, spent caustic solutions, oil-water separators, and cooling water systems), oil and gas production (e.g., frack water treatment and re-use, product desulfurization, and well stimulation/permeability improvement), and chemical plants (e.g., for toxicity reduction and/or biodegradability improvement of process wastewaters prior to biological treatment and/or discharge). Further, the process can be utilized in municipal leachates and wastewaters for organic oxidation (e.g., for waste-activated sludge (WAS) pre-treatment prior to or during aerobic or anaerobic digestion and organic phosphorus digestion to affect ortho-phosphate removal) and inorganic oxidation (e.g., for conversion of ferrous ion to ferric ion to affect chemically-enhanced primary treatment, and solids de-watering). Other potential uses include: as a microbiocide for the above applications, including biofilm control in piping circuits (continuous or intermittent shocking) and algae control in water reservoirs; microbiocide for horticultural and agricultural soils, growth media, and irrigation circuits; desulfurization of hydrocarbons derived from petroleum or biofeedstocks (e.g., crude sulfated turpentine and low-sulfur diesel fuels); predigestion of biomass to affect the hydrolysis/solubilization of for example lignin, lignocellulose, or microbial cells (e.g., from waste activated sludge or algae from biofuel operations) prior to fermentation or digestion; digestion of organic materials to affect the separation of associated inorganic material(s) (e.g., breaking up organically-bound metal or mineral complexes such as metal chelates or sequestered phosphates); and any other uses of the invention which would be obvious to a person skilled in the art.

The process described herein can also be implemented to efficiently mediate the oxidation of organic contaminants in, for example, industrial effluents. As will be understood, when ferrous ion is oxidized to ferric ion by hydrogen peroxide, hydroxyl radical (●OH) is a by-product of the reaction and can be used to oxidize various organic species, including benzene, toluene, ethylbenzene, and xylenes. In some embodiments, $H_2S$ is already present in the substrate (e.g., in a refinery sour gas stream or oil and gas refinery wastewater), and treatment can be initiated by adding Fe(III)-PP (e.g., Fe(III)-TPP) to the substrate, followed by hydrogen peroxide. In other embodiments $H_2S$ can be added to the substrate (e.g., effluent or wastewater) followed by the addition of Fe(III)-PP and hydrogen peroxide. Where $H_2S$ is added, typically the sulfide is added first, followed by the Fe(III)-polyphosphate, followed by the hydrogen peroxide. Other reducing reagents may also be used if Fe(III)-PP is employed to oxidize organic contaminants in a fluid.

The source of the sulfide ion dissolved in an aqueous solution comprising Fe(III)-PP can vary. In preferred embodiments, the sulfide is derived at least from $H_2S$. Further, in some embodiments $H_2S$ is not present or is present in combination with other sulfur-containing compounds (e.g., thiols), such that at least some of the Fe(III)-PP in solution is reduced by the non-$H_2S$ sulfur-containing compound. Herein the term "thiol" refers to any thiol compound that is soluble in aqueous solutions and capable of being oxidized by Fe(III), including methanethiol, ethanethiol, mercaptans, etc. Accordingly, disclosed is a process for the oxidation of hydrogen sulfide or an organic sulfur containing contaminant (i.e., thiols e.g., methyl thiol, disulfides e.g., dimethyl disulfide, thioethers e.g., dimethyl sulfide, sulfoxides e.g., dimethyl sulfoxide, thiophenes e.g., tetrahydrothiophene and thiourea), the process comprising reacting the hydrogen sulfide or organic sulfur containing contaminant with a ferric ion in an aqueous solution, wherein the ferric ion is complexed with a polyphosphate.

Non-limiting examples of polyphosphates that can be used to implement the process described herein include tripolyphosphate, tetrapolyphosphate, pentapolyphosphate, and hexapolyphosphate.

The process described herein is very fast with a short hydraulic residence time and can be implemented in a continuous process without the need for a reaction tank. Further, the process may be used to retrofit existing vapor treatment systems and wastewater treatment operations or to enhance the performance of other treatment technologies. Depending on the particular embodiment, there are various advantages that may be associated with the presently described process over a conventional Fenton's reaction, including the need for less iron catalyst, which is associated with a reduction of chemical cost and sludge production; a more "aggressive" reaction with faster reaction times and/or very short hydraulic retention time, allowing the process to be applied on-line with less operator manpower and more efficient utilization of hydrogen peroxide; and a simplification of the Fenton process, for example because pH adjustments are unnecessary.

FIG. 1 is a highly schematic illustration of one embodiment of a process to oxidize hydrogen sulfide and organics present in a vapor stream. The gas enters a reactor where it is contacted with a solution comprising Fe(III)-PP (e.g., Fe(III)-TPP), resulting in oxidation of the hydrogen sulfide by Fe(III), which is correspondingly reduced to Fe(II). The Fe(II)-PP is then oxidized back to Fe(III)-PP by for example $H_2O_2$, $O_2$, or air, which can generate OH radicals that can be used to oxidize organic contaminants present in the vapor streams. Herein the term "reactor" has a broad meaning that encompasses any vessel capable of containing fluid (e.g., an aqueous solution comprising Fe(III)-PP) and in which fluid can be mixed. Examples of possible reactor types may include: a pipe (tubular, plug-flow) reactor, a continuously stirred tan reactor (CSTR), a baffled (plug-flow) tank or vessel, a basin or lagoon, a recirculating vapor scrubber (packed-tower), a pressurized plug-flow or CSTR reactor (pressure will increase the solubility of O2), and treatment processes exhibiting one or more of the above aspects e.g., dissolved gas flotation cells.

Figure 2:
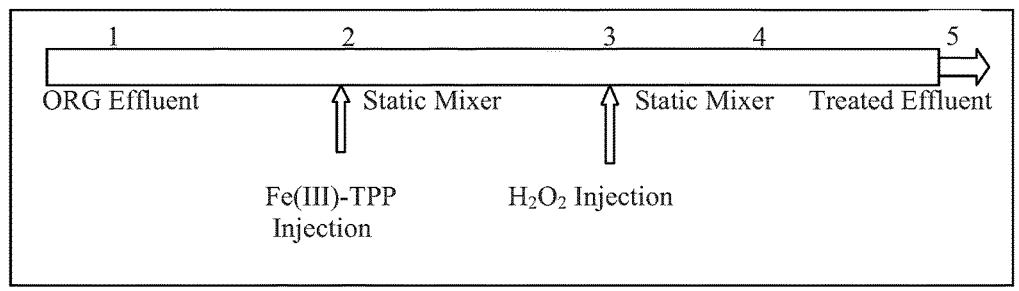
FIG. 2 is a schematic illustration of a method for treating effluent with Fe(III)-TPP and hydrogen peroxide, according to an embodiment of the invention.

FIG. 2 is a highly schematic illustration of one embodiment of a method to implement the process described herein for the abatement of $H_2S$ and organics present in an effluent steam contaminated with organic pollutants. At stage 1, the effluent stream passes into a reactor (e.g., a pipe reactor). At stage 2, a solution comprising Fe(III)-TPP is injected into the stream, resulting in the oxidation of hydrogen sulfide present in the effluent by Fe(III)-TPP, which is correspondingly reduced to Fe(II)-TPP. At stage 3, $H_2O_2$ is injected into the stream resulting in the oxidation of the Fe(II)-TPP back to Fe(III)-TPP, as well as the generation of OH-radicals, which at stage 4 oxidize organic contaminants present in the effluent. At stage 5 the treated effluent emerges from the stream. Note that, for contaminated waters devoid of sour gas or thiols, a sulfide injection port can be added to the reactor.

Example 1

Figure 3:
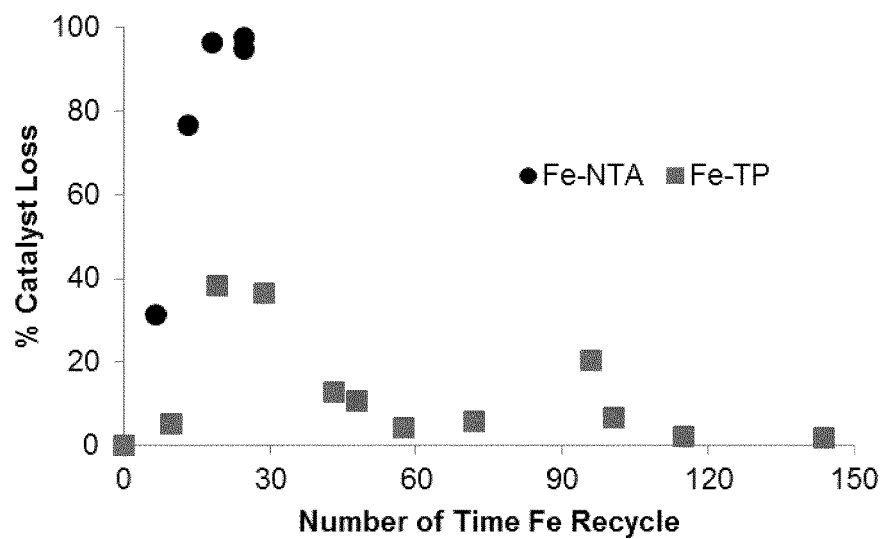
FIG. 3 shows the rates of loss of Fe(III)-NTA and Fe(III)-TPP catalysts during the air oxidation of $H_2S$ versus the number of times iron was recycled.

Catalytic oxidation of $H_2S$ with air. To demonstrate that air oxidation of hydrogen sulfide catalyzed by Fe(III)-TPP does not lead to significant loss of catalyst, the rate of loss of Fe(III)-TPP as a function of concentration of sulfide ion oxidized in the presence of air was followed and compared to the rate of loss of Fe(III)-nitrilotriacetate (NTA), one of the most popular catalysts for the air oxidation of hydrogen sulfide. In these tests, approximately 30-50 mL of a borate buffered (pH ~7) solution containing about 13 mM to 50 mM iron complex was added to an Erlenmeyer flask, spiked with a known concentration of sulfide, mixed with a magnetic stirrer, and the sulfide allowed to oxidize. After complete oxidation of the sulfide, solution pH was measured and was reduced to about 5.7-7.0, and the above process continued The concentration of iron dissolved in water was also measured at regular intervals. FIG. 3 shows the rate of loss of catalyst vs the number of times of iron has been recycled. As can be seen, approximately 95% of Fe(III)-NTA was lost after recycling iron about 25 times while less than 5% of Fe-TPP was lost after iron was recycled more than 140 times. Note that the initial loss of Fe(III)-TPP is attributed to analytical errors due to analysis of iron before the complete oxidation of sulfide.

Example 2

Figure 4:
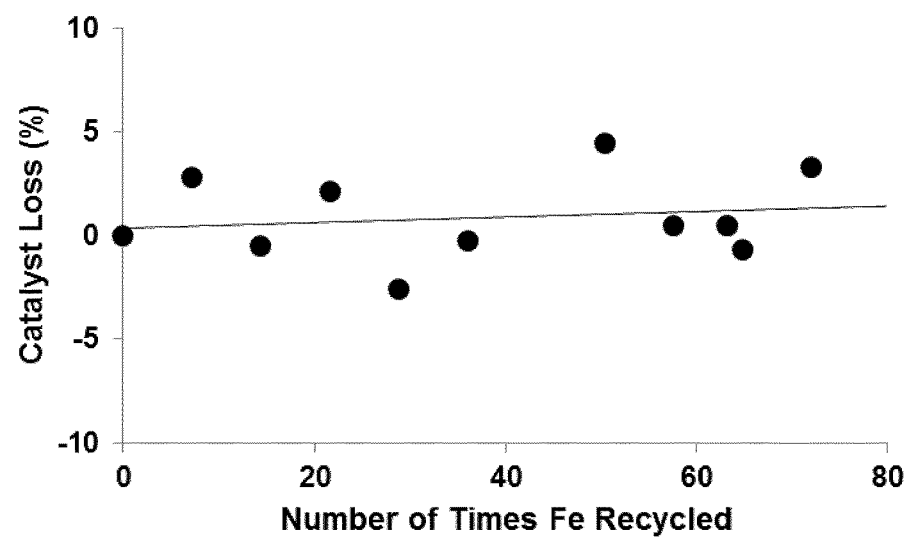
FIG. 4 shows the rate of loss of Fe(III)-TPP catalyst during the oxidation of $H_2S$ in the presence of $H_2O_2$ versus the number of times iron was recycled.

Catalytic oxidation of $H_2S$ with hydrogen peroxide ($H_2O_2$). To 50 mL of borate buffered solution, pH ~8, containing approximately 15 mM Fe-TPP (850 mg/L as Fe(III), Fe(III):TPP stoichiometric ratio was 1:2) was added 5.5 mM of $HS^-$ (181.5 mg/L); sulfide was oxidized to elemental sulfur and Fe(III)-TPP was reduced to Fe(II)-TPP. The ferrous ion generated in this way was oxidized to ferric ion by addition of quantitative amounts of $H_2O_2$ and the above process was continued one hundred times. The solution pH was controlled during the above processes and was maintained between about 7.5 and 8.7. The concentration of iron dissolved in water was determined at regular intervals. The results are presented in FIG. 4, which shows that iron concentration and by extension catalyst concentration, within experimental error, did not change after recycling iron more than seventy times.

Example 3

Reduction of Toxicity of Refinery Wastewater. Refinery wastewaters are often found to be toxic to nitrifying bacteria. A series of tests were performed on 4 different wastewater streams from a refinery in the US to show that their toxicity can be reduced with Fe-TPP (Fe(III):TPP stoichiometric ratio was 1:2) and $H_2O_2$ provided wastewater is contaminated with sulfide and/or mercaptans or other reducing agents. To approximately 250 mL of wastewater was added approximately 112 to 224 mg/L of Fe-TPP catalyst and varying amounts of $H_2O_2$. The solutions were tested for their toxicities before and after treatment employing Microtox and the results are presented in Table 1 along with several water quality parameters. As can be seen, the toxicity of water containing hydrogen sulfide was reduced by about 74% to 79%; the toxicity of wastewater with the lowest sulfide concentration was also reduced by about 40%, perhaps due to the presence of mercaptans and other reducing agents in this water.

Example 4

To 250 mL of borate-buffered (pH 8) solution containing approximately 60 mg/L of benzoic acid (BA) were added 20 mg/L (as Fe(III)) of Fe(III)-TPP (Fe(III):TPP stoichiometric ratio was 1:2)), 16 mg/L of hydrogen sulfide and 40 mg/L of $H_2O_2$. Samples were taken after about 10 and 40 min. and analyzed for benzoic acid and $H_2O_2$; this was repeated twice and approximately 38% of $H_2O_2$ was consumed and 25±5% of BA was oxidized to hydroxylpbenzoic acids (HBA); para-HBA was identified to be the major by-product of oxidation of BA.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

TABLE 1

Refinery wastewater quality data, test conditions and % toxicity reduction.

| Wastewater | pH | Sulfide/ mg/L | COD/ mg/L | Fe(III)-TPP$_2$/ mg/L | H$_2$O$_2$/ mg/L | % Toxicity Reduction |
|---|---|---|---|---|---|---|
| 1 | 8.2 | >80 | 5800 | 224 | 10,000 | 74 |
| 2 | 9.6 | <1 | 11870 | 112 | 5000 | 42 |
| 3 | 7.6 | >300 | 2175 | 224 | 1500 | 75 |
| 4 | 9.9 | 35 | 3300 | 112 | 1500 | 79 |

REFERENCES

Biaglow, J. E. and Kachur, A. V. (1997). The generation of hydroxyl radicals in the reaction of molecular oxygen with polyphosphate complexes of ferrous ion, *Rad. Res.* 148, 181-187.

Cox, H. W. (2005). Method for reduction of H$_2$S contamination, U.S. Pat. No. 6,960,330.

Chen, D., Motekaitis, R. J., Martell, A. E, and McManus, S. ((1993). Oxidation of H$_2$S to S by air with Fe(III)-NTA as a catalyst: catalyst degradation, *Can J. Chem.*, 71, 1524-1531.

DeBerry, D. (1997). Chemical evolution of liquid redox processes, *Environ. Progress* 16, 193-199.

De Laat, J., Dao, Y. H., El Najjar, N. H., and Daou, C. (2011). Effect of some parameters on the rate of the catalysed decomposition of hydrogen peroxide by iron (III)-nitrilotriacetate in water, *Wat. Res.* 45, 5654-5664.

Diaz, Z. H$_2$S removal. U.S. Pat. No. 4,388,293, Jun. 14, 1983.

Diaz, Z. Method of removing hydrogen sulfide from gases utilizing a stabilized iron chelate solution. U.S. Pat. No. 4,382,918, May 10, 1983.

Hua, G. X., McManus, D. and Woolin J. D. (2001) The evolution, chemistry and application of homogeneous liquid redox sulfur recovery techniques, *Comment Inorg. Chem.* 22, 327-351.

Hua, G. X., Zhang, Q., McManus, D., Slawin, A. M. Z. and Woolin J. D. (2005) The evolution, chemistry and application of homogeneous liquid redox sulfur recovery techniques, *Main Group Chem.* 4, 157-175.

Kachur, A. V., Tuttle, S. W., and Biaglow, J. E. (1998). Autoxidation of ferrous ion complex: A method for the generation of hydroxyl radicals, *Rad. Res.* 150, 475-482.

McManus, D. et al. Tridentate metal ligands of chertain pyridine phosphonic acids. U.S. Pat. No. 5,686,613, Nov. 11, 1997.

McManus, D. et al. Oxidation-reduction process. U.S. Pat. No. 5,591,419, Jan. 7, 1997.

Neumann, D. W., and Lynn, S. (1984). Oxidative absorption of H$_2$S and O2 byiron chelate solution, *AIChE J.* 30, 62-69.

Pignatello, J. J. (2000). Soil decontamination using ferric chelates and peroxide, U.S. Pat. No. 6,160,194.

Sawyer, D. T. and Sobkowiak, A. Conversion of H$_2$ to sulfur. U.S. Pat. No. 5,273,734, Dec. 28, 1993.

Wang, L., Wang, F., Li, P., and Zhang, L. (2013). Ferrous-tetrapolyphosphate complex induced dioxygen activation for toxic organic pollutants degradation, *Separation & Purification J.* 120, 145-158.

What is claimed is:

1. A process for treatment of a fluid comprising an oxidizable contaminant selected from one or both of a sulfide and a thiol, the process comprising the step of contacting the fluid with a first complex of ferric iron and a polyphosphate to oxidize the oxidizable contaminant and generate a second complex of ferrous ion and the polyphosphate.

2. The process defined in claim 1, comprising the further step of contacting the second complex with an oxidizing agent to regenerate the second complex.

3. The process defined in claim 2, wherein the oxidizing agent comprises oxygen.

4. The process defined in claim 2, comprising the further step of producing hydrogen peroxide.

5. The process defined in claim 2, wherein the oxidizing agent comprises hydrogen peroxide and a hydroxyl radical is produced.

6. The process defined in claim 5, comprising contacting the hydroxyl radical with one or more oxidizable organic compounds.

7. The process defined in claim 6, wherein the one or more organic compounds are contaminants in wastewater.

8. The process defined in claim 6, wherein the one or more organic compounds are selected from the group consisting of: phenol, benzene, toluene, ethylbenzene, a xylene, and any mixture of two or more of these.

9. The process defined in claim 1, wherein the fluid is selected from the group consisting of: natural gas, a refinery vapor stream, a refinery sour gas stream, wastewater, and sludge.

10. The process defined in claim 1, employed to remove one or more odorous compounds.

11. The process defined in claim 1, wherein the polyphosphate is selected from the group consisting of: tripolyphosphate, tetrapolyphosphate, pentapolyphosphate, and hexapolyphosphate.

12. The process defined in claim 1, wherein the polyphosphate is tetrapolyphosphate.

13. The process defined in claim 1, used for liquid redox sulfur recovery.

14. The process defined in claim 1, wherein the ferric ion complexed to the polyphosphate is a catalyst for the oxidation reaction.

15. The process defined in claim 1, wherein the step of contacting the fluid with a first complex of ferric iron and a polyphosphate is conducted at a pH of between 3 and 10.

16. A method for reducing the toxicity of a fluid, the method comprising:
   adding to a reactor a fluid comprising one or more organic compounds and at least one of hydrogen sulfide or a thiol;
   contacting the fluid with a first complex of ferric ion and a polyphosphate to form a first mixture; and
   adding hydrogen peroxide to the first mixture to form a second mixture.

17. A method for reducing the toxicity of a fluid, the method comprising:
   adding to a reactor a fluid comprising one or more organic compounds;
   mixing at least one of hydrogen sulfide or a thiol with the fluid to form a first mixture;
   mixing the first mixture with an aqueous solution comprising a ferric ion complexed with a polyphosphate to form a second mixture; and
   adding hydrogen peroxide to the second mixture to form a third mixture.

18. The method of claim 17, wherein the at least one of hydrogen sulfide or thiol is oxidized by the ferric ion to generate a second complex of ferrous ion and the polyphosphate.

19. The method of claim 17, wherein the one or more organic compounds is selected from the group consisting of: phenol, benzene, toluene, ethylbenzene, a xylene, and a mixture of two or more of these.

20. The method of claim 17, wherein the fluid is selected from the group consisting of: natural gas, a refinery vapor stream, a refinery sour gas stream, wastewater, and sludge.

* * * * *